US007012951B2

(12) United States Patent
Eo et al.

(10) Patent No.: US 7,012,951 B2
(45) Date of Patent: Mar. 14, 2006

(54) SYMBOL COMBINING METHOD FOR REDUCING THE NUMBER OF FIFO REGISTERS OF FINGER, RAKE RECEIVER AND METHOD FOR DRIVING THE RAKE RECEIVER

(75) Inventors: Ik-Soo Eo, Taejon (KR); Kyung-Soo Kim, Taejon (KR); Seong-Joo Lee, Seoul (KR); Jae-Seok Kim, Koyang (KR)

(73) Assignees: Electronics and Telecommunications Research Institute, Taejon (KR), part interest; VK Corporation, Kyonggi-do (KR), part interest ( * ) Notice: Subject to any disclaimer, the term of this patent is extended or adjusted under 35 U.S.C. 154(b) by 898 days.

(21) Appl. No.: 09/871,995

(22) Filed: May 31, 2001

(65) Prior Publication Data

US 2002/0094021 A1   Jul. 18, 2002

(30) Foreign Application Priority Data

Nov. 29, 2000   (KR)   .............................. 2000-71747

(51) Int. Cl.
*H04K 1/00*   (2006.01)
(52) U.S. Cl. ................................................... 375/148
(58) Field of Classification Search ................ 370/335, 370/342; 375/130, 140, 257, 295, 296, 316, 375/346
See application file for complete search history.

(56) References Cited

U.S. PATENT DOCUMENTS 5,233,626  A      8/1993  Ames ............................ 375/1
6,498,789  B1 *  12/2002  Honda ......................... 370/342

* cited by examiner

*Primary Examiner*—Kenneth Vanderpuye
*Assistant Examiner*—Dung X. Nguyen
(74) *Attorney, Agent, or Firm*—Seed IP Law Group PLLC

(57) ABSTRACT

A symbol combining method in a Rake receiver, which relates to a method for combining the demodulated multi-path signals in a demodulation process of a code division multiple access communication system. The symbol combining method, a Rake receiver using the symbol combining method and a method for driving the Rake receiver, remarkably reduce a hardware complexity of a FIFO register used to regulate a timing synchronization of each finger in Rake receiver by using a new algorithm in a combining process when a CDMA communication system combines a plurality of multi-path signals therebetween. Whereas a conventional combining algorithm uses an individual FIFO register every finger so as to adjust a timing synchronization of each symbol before combining a demodulated symbol, the inventive combining algorithm performs a symbol combining operation as well as a timing synchronization of a symbol at the same time, and performs a combining action by using only one FIFO register irrespective of the number of fingers.

16 Claims, 7 Drawing Sheets

Where, $S_i^j$ : i-th symbol data of the j-th finger
$wp_j$ : writing point of the j-th finger
$rp$ : reading point of the combiner

FIG. 2
*Prior Art*

| Specification | IS-95 CDMA | MC-CDMA | Increasing factor |
|---|---|---|---|
| Minimum symbol duration | 64 PN chip | 4 PN chip | (1) FIFO depth: 16-times increasing |
| Carrier wave | 1 | 3 | (2) FIFO number: 3-times increasing |
| The number of maximum transmission channels | 1 | 2 | (3) FIFO number: 2-times increasing |
| Symbol modulation method | BPSK | QPSK | (4) FIFO number: 2-times increasing |
| Final hardware increasing | | | 192-times (=16×3×2×2) |

SYMBOL COMBINING METHOD FOR REDUCING THE NUMBER OF FIFO REGISTERS OF FINGER, RAKE RECEIVER AND METHOD FOR DRIVING THE RAKE RECEIVER

TECHNICAL FIELD

The present invention relates to a symbol combining method in a Rake receiver. More particularly, it relates to a method for combining the demodulated multi-path signals in a demodulation process of a code division multiple access (CDMA) communication system.

BACKGROUND OF THE INVENTION

In IS-95 technology, a Rake receiver has enhanced a SNR (signal-to-noise ratio) performance by combining multi-path signals. But, each of the multi-path signals has a time delay, so that a timing synchronization among the plurality of multi-path signals should be regulated so as to combine the multi-path signals. Therefore, each finger of a Rake receiver should have an independent FIFO (First-In First-Out) register in order to achieve a timing synchronization of the multi-path signals. Such a structure does not generate a serious problem with respect to IS-95 technology because the number of FIFO registers is small and the size of FIFO registers is small as well.

However, with the trend of evolving of a mobile communication system to IMT-2000 system, a high-speed data transmission is needed. As the number of fingers increases and a symbol duration is reduced, the number of FIFO registers and the size should be increased abruptly. In IMT-200 system where the hardware complexity factor of the Rake receiver becomes a very important problem, abruptly increasing the number of the hardware of the FIFO registers causes a very serious problem in designing the Rake receiver. Therefore, there is a limitation in designing the Rake receiver of IMT-2000 system by using a conventional symbol combining algorithm.

FIG. 1 is a conceptual diagram illustrating a symbol combining method of a conventional IS-95 system.

Each finger has its own FIFO registers, demodulates a symbol in response to its own demodulation time, and stores the demodulated symbols (1), (2) and (3) in the blocks (1), (2) and (3) of a FIFO register of each finger. If the symbols are accumulated, a combiner reads a plurality of symbols (4),(5) and (6) having the same timing reference in each finger and then combines them (4)–(6). In the meantime, a depth of FIFO register of FIG. 1 should have a magnitude by which a signal is not lost in a hand-off state or a multi-path fading state. In a conventional IS-95 system, the depth of the FIFO register has been designed in eight-stages.

As shown in FIG. 1, in the conventional symbol combining method, each finger should employ its own FIFO register so as to adjust a timing synchronization of the demodulated symbols. This is not considered as an important problem in case of a system like IS-95 system having a small number of fingers and a shallow depth of FIFO, but this poses a very considerable problem in IMT-2000 system having a great number of fingers and a large-sized FIFO.

FIG. 2 is a table illustrating the increase of a hardware complexity of FIFO register in case that a conventional symbol combining algorithm is applied to the IMT-2000 system as it is.

Referring to FIG. 2, a first increase factor (1) corresponds to the increasing degree of FIFO register's depth in IMT-200 system as compared with IS-95 system. A second increase factor (2), a third increase factor (3), and a fourth increase factor (4) correspond to the increasing degree of the number of FIFO registers in IMT-2000 system as compared with IS-95 system. Considering all of the increase factors, it can be seen that the FIFO register of the IMT-2000 system has a hardware complexity 192 times greater than that of the FIFO register of the IS-95 system. This result means that a conventional symbol combining algorithm may bring about a very serious problem in the IMT-200 system, in which the hardware complexity is considered as the most important factor.

SUMMARY OF THE INVENTION

Accordingly, the present invention is directed to a symbol combining method for reducing the number of FIFO registers of finger, Rake receiver and a method for driving the Rake receiver, that substantially obviate one or more of the problems caused by the limitations and disadvantages of the related art.

It is an object of the present invention to provide a symbol combining method, a Rake receiver using the symbol combining method and a method for driving the Rake receiver, that remarkably reduce a hardware complexity of a FIFO register used to regulate a timing synchronization of each finger in Rake receiver by using a new algorithm in a combining process when a CDMA communication system combines a plurality of multi-path signals.

To achieve these and other advantages and in accordance with the purpose of the present invention, as embodied and broadly described, a Rake receiver for performing a symbol combining function with respect to demodulated multi-path signals in a demodulation step of a code division multiple access (CDMA) communication system, being characterized in that the Rake receiver includes only one FIFO (First-In First Out) register, accumulates a plurality of previously-stored FIFO register values by using an adding part, and then stores the accumulated value in the FIFO register when storing a finger-demodulated symbol in the FIFO register.

In another aspect, in a symbol combining method of a demodulated multi-path signal in a demodulation step of CDMA communication system, the symbol combining method accumulates a plurality of previously-stored FIFO register values by using an adding part and then stores the accumulated value in the FIFO register, when a finger-demodulated symbol is stored in the FIFO register.

In a still another aspect, the present invention provides a symbol combining method for driving a Rake receiver including only one FIFO register, accumulating a plurality of previously-stored FIFO register values by using an adding part and then storing the accumulated value in the FIFO register when storing a finger-demodulated symbol in the FIFO register, the method further comprising the steps of:

when storing data in the FIFO register after finishing a processing of the symbol data in an i-th finger, selecting a symbol data and a pseudo noise(PN) phase of the i-th finger;

calculating a writing position of indicating a block of the register where the symbol data is stored, by using the selected PN code phase; and reading the data of the block located at the calculated writing position, combining the read block data with the symbol data to be stored, and storing a resultant value into the block located at the calculated writing position.

In a still another aspect, the present invention provides a symbol combining method for driving a Rake receiver including only one FIFO register, accumulating a plurality of previously-stored FIFO register values by using an adding part and then storing the accumulated value in the FIFO register when storing a finger-demodulated symbol in the FIFO register, the method further comprising the steps of:

a) when storing data in the FIFO register after finishing a processing of the symbol data in an i-th finger, selecting a symbol data and a pseudo noise(PN) phase of the i-th finger;

b) calculating a writing position of indicating a block of the register where the symbol data is stored, by using the selected PN code phase;

c) reading the data of the block located at the calculated writing position, combining the read block data with the symbol data to be stored, and storing a resultant value into the block positioned at the calculated writing position;

d) repeating the steps (a), (b) and (c);

e) upon generation of a reading signal, calculating a block position of FIFO register to be read; and f) selecting a data located at the calculated block position of the FIFO register in the step(e), transmitting the data to a combiner, and then initializing the register.

In a still another aspect, the present invention provides a computer-readable recording medium recording a program for executing a symbol combining of demodulated multi-path signals in a demodulation step of a CDMA communication system, wherein the program executes the steps of:

accumulating a plurality of previously-stored FIFO register values by using an adding part; and storing the accumulated value in the FIFO register, when storing a finger-demodulated symbol in the FIFO register.

In a still another aspect, the present invention provides a computer-readable storage medium recording a program for executing a symbol combining method for driving a Rake receiver that includes only one FIFO register, and accumulates a plurality of previously-stored FIFO register values by using an adding part, and then stores the accumulated value in the FIFO register when storing a finger-demodulated symbol in the FIFO register, being characterized in that the program executes the steps of:

when storing data in the FIFO register after finishing a processing of the a symbol data in an i-th finger, selecting a symbol data and a pseudo noise(PN) phase of the i-th finger;

calculating a writing position of indicating a block of the register where the symbol data is stored, by using the selected PN code phase; and reading the data of the block located at the calculated writing position, combining the read block data with the symbol data to be stored, and storing a resultant value into the block located at the calculated writing position.

In a still another aspect, the present invention provides a computer-readable storage medium containing a program for executing a symbol combining method for driving a Rake receiver that includes only one FIFO register, accumulates a plurality of previously-stored FIFO register values by using an adding part, and then stores the accumulated value in the FIFO register when storing a finger-demodulated symbol in the FIFO register, being characterized in that the program executes the steps of:

a1) when storing data in the FIFO register after finishing a processing of the symbol data in an i-th finger, selecting a symbol data and a pseudo noise(PN) phase of the i-th finger;

b1) calculating a writing position of indicating a block of the register where the symbol data is stored, by using the selected PN code phase;

c1) reading the data of the block located at the calculated writing position, combining the read block data with the symbol data to be stored, and storing a resultant value into the block located at the calculated writing position.

d1) repeating the steps (a1), (b1) and (c1);

e1) upon generation of a reading signal, calculating a block position of FIFO register to be read; and f1) selecting a data located at the calculated block position of the FIFO register in the step(e1), transmitting the data to a combiner, and then initializing the block.

Preferably, the program recorded on the computer-readable medium determines a writing position of the FIFO register by using the following mathematical equation:

$$W = \left(\left\lfloor \frac{P}{S} \right\rfloor - 1\right) \bmod N$$

where, [x] is a maximum integer below 'x', x mod y(modulo-operation) is a remainder when 'x' is divided by 'y', W is a variable indicating a storage position of a selected symbol data, P is a variable indicating a timing reference of each symbol by using a phase of PN code, S is a variable indicating a symbol duration, and N is a depth of FIFO register.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The embodiments of the present invention will be explained with reference to the accompanying drawings, in which:

FIG. 2 is a table illustrating that a hardware complexity of FIFO register increases in case that a conventional symbol combining algorithm is applied to the IMT-2000 system;

DETAILED DESCRIPTION OF THE INVENTION

Reference will now be made in detail to the preferred embodiments of the present invention, examples of which are illustrated in the accompanying drawings.

Figure 1:
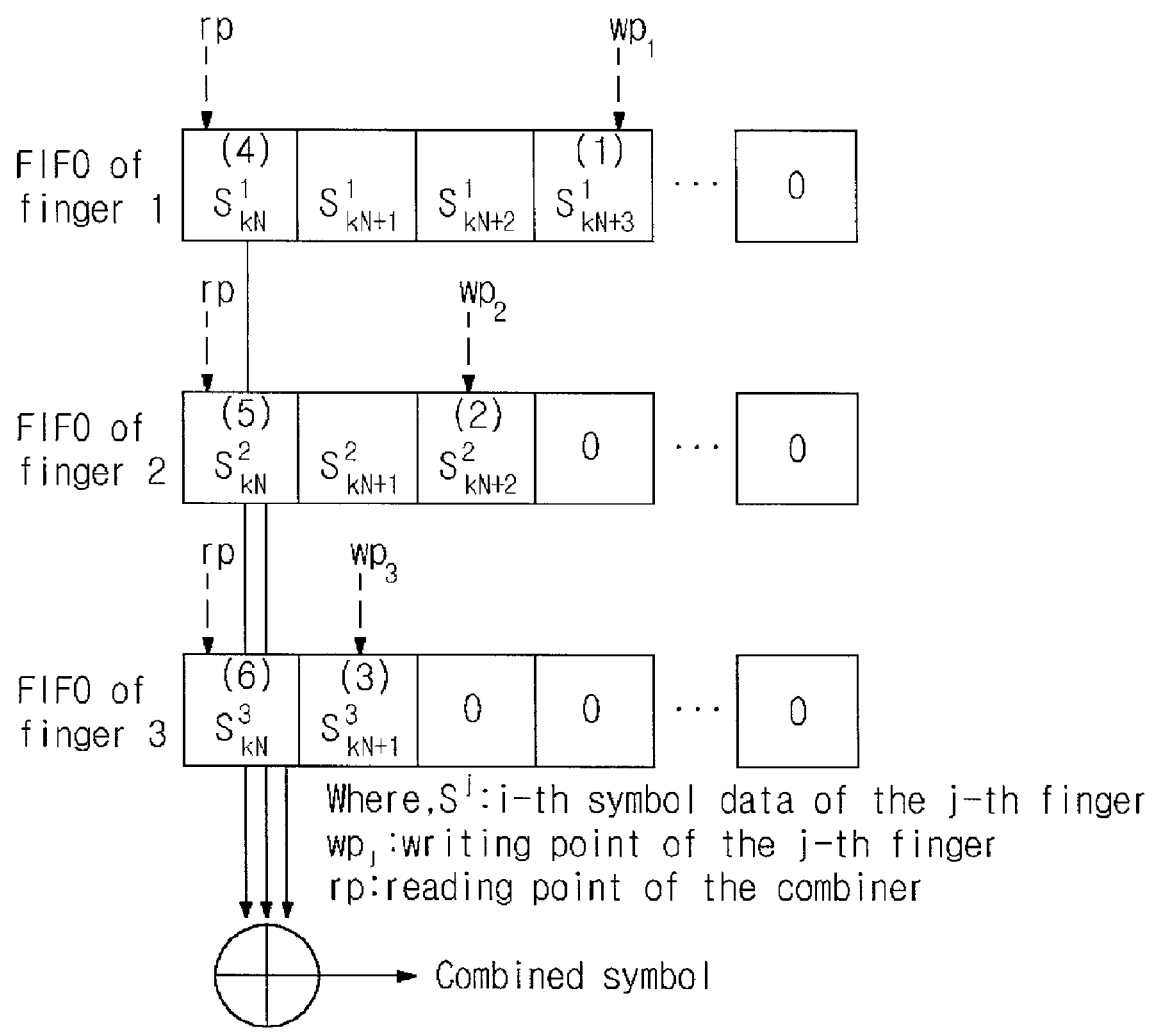
FIG. 1 is a conceptual diagram illustrating a symbol combining method of a conventional IS-95 system.
Figure 3:
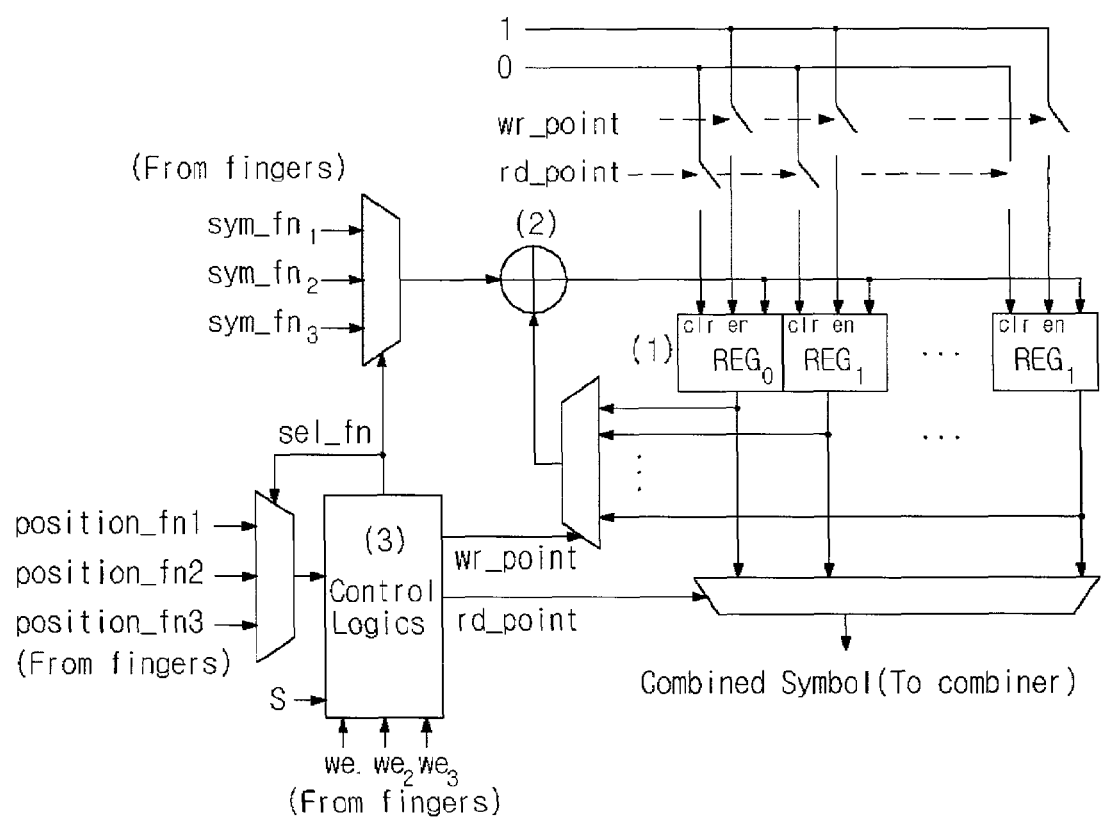
FIG. 3 is a conceptual block diagram illustrating that a new symbol combining algorithm is applied to a Rake receiver using three fingers according to a preferred embodiment of the present invention.

FIG. 3 is a conceptual block diagram illustrating that a new symbol combining algorithm is applied to a Rake receiver using three fingers according to a preferred embodiment of the present invention.

Referring to FIG. 3, the inventive preferred embodiment of the present invention employs only one FIFO register (1) whereas the prior art employs a plurality of FIFO registers. However, when a finger-demodulated symbol is stored in the FIFO register, the inventive preferred embodiment adds the symbol to a previously stored FIFO register value by using an adder 2 and then stores the added value of them in the FIFO register (1). Thus, the inventive preferred embodiment may store a plurality of symbols received from each finger with simultaneous combining operation. In this manner, it is possible to perform not only a combining step of a symbol demodulated in each finger but also a timing synchronization of the symbol in just one operation.

A control logic part of FIG. 3 determines that a transmitted symbol demodulated in a finger is to be stored into which block position of FIFO register. At the same time, the control logic part helps a symbol combiner to read accurately a combined symbol data. As to the input signals of the control logic part (3), a plurality of demodulated symbol data 'sym_fn$_1$', 'sym_fn$_2$', and 'sym_fn$_3$' are input to the control logic part (3) as a signal received from each finger, a plurality of writing signals 'we$_1$', 'we$_2$', and 'we$_3$' for writing these data in the FIFO register are input to the control logic part (3), a plurality of signals 'position_fn$_1$', 'position_fn$_2$', and 'position_fn$_3$' for indicating a timing reference of each symbol as a phase of PN code are input to the control logic part (3), and a signal S for indicating a magnitude of a symbol duration is input to the control logic part (3). In addition, there is a signal 're' for reading a combined symbol data in an input signal from the symbol combiner. All of these signals were employed in a conventional IS-95 system, therefore these signals are not new signals that are newly devised for the combining algorithm of the present invention As to the output signals of the control logic part (3), a signal 'sel_fn' for selecting one between a symbol data and a timing reference signal that are generated from a plurality of fingers, a signal 'wr_point' for informing a storage position of a selected symbol data, and a signal 'rd_point' for indicating a position of a combined symbol data to be read are generated from the control logic part (3). A combiner reads a register output of a block indicated by the signal 'rd_point', and initializes the register output in order to make each finger read the next symbol data. In the meantime, a method for determining the signals 'wr_point' and 'rd_point' will be described in the following.

CDMA communication system is a synchronous system in either IS-95 system or MC-CDMA system. In other words, PN code generated from all base stations is synchronized with an absolute time and then transmitted. The CDMA communication system determines a frame boundary of a traffic channel to be transmitted, by using a phase of the PN code. As a result, a timing reference of a symbol data can be obtained by using a phase of the PN code transmitted from a base station. The following mathematical equation (1) explains how to determine a storage position 'wr_point' of a demodulated symbol data by using the PN code phase.

$$W = \left(\left\lfloor \frac{P}{S} \right\rfloor - 1\right) \bmod N \qquad (1)$$

where, $\lfloor x \rfloor$ is a maximum integer below 'x', x mod y(modulo-operation) is a remainder when 'x' is divided by 'y', W is a variable 'wr_point' indicating a storage position of a selected symbol data, P is a variable 'position_fn' indicating a timing reference of each symbol by using a phase of PN code, S is a variable indicating a symbol duration, and N is a depth of FIFO register. Herein, the variable 'position_fn' means a phase value of PN code of a selected finger among three fingers.

The reason why the number '−1' is used in the Equation (1) is as follows. When a symbol is demodulated in a finger, a PN code despreading and a phase error elimination step are needed. This step is not terminated in a symbol duration, but is terminated after finishing the symbol duration, therefore a symbol transmitted from a finger becomes lagged by 1 symbol with respect to the transmission time of the actual symbol. In conclusion, the number '−1' in the Equation (1) is used to compensate the time lag generated in the aforementioned case. The symbol duration 'S' of the Equation (1) and the depth 'N' of FIFO register have a value in a format of $2^x$ in not only IS-95 system but also IMT-2000 system. Therefore, the mathematical Equation (1) can be very simply embodied as a hardware.

Figure 4:
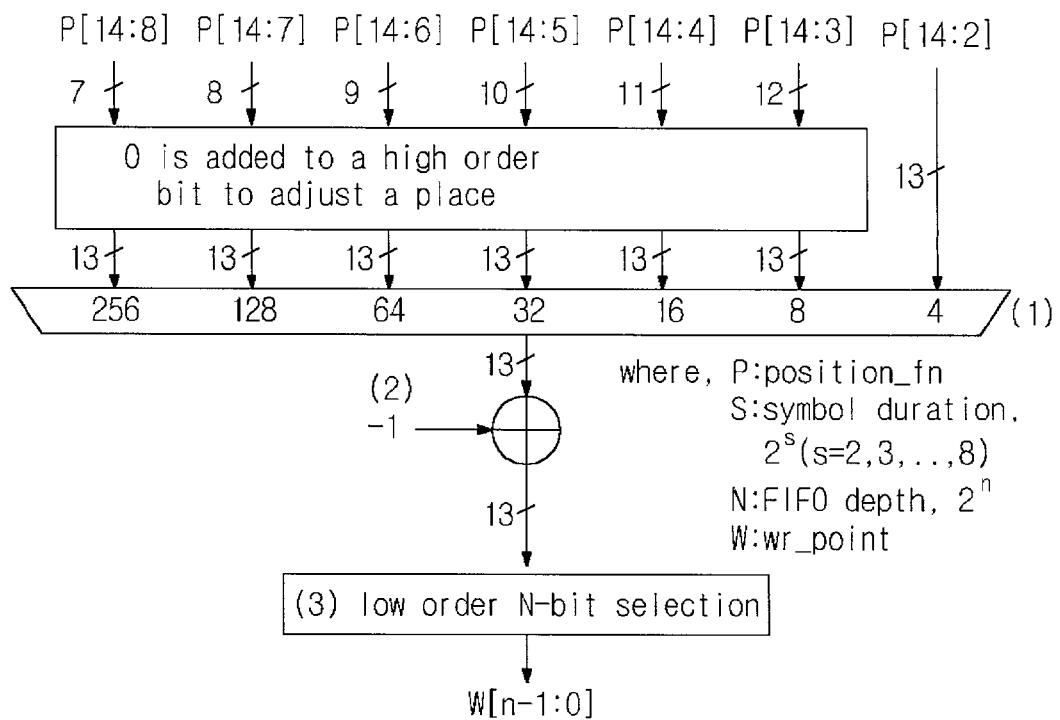
FIG. 4 is a conceptual diagram illustrating a method for generating a parameter 'wr_point' in a control logic part shown in FIG. 3.

FIG. 4 is a conceptual diagram illustrating a method for generating a variable 'wr_point' in a control logic part (3) shown in FIG. 3.

Referring to FIG. 4, a variable P being 'position_fn' is set to 15 bits, a symbol duration S is set to $2^S$ PN chips(s=2, 3, . . . , 7), and a depth N of FIFO register is set to $2^n$. First, an output value of the variable 'position_fn' is divided by a value of the signal S. In this case, since the value of the symbol duration S is $2^S$ format and a division result is expressed as an integer, a division can be simply implemented by using a bit selection of the variable 'position_fn' and a multiplexer (1). Next, a value '−1' (2) is added to a division result so as to compensate a time delay, and then a modulo-operation is executed by considering the depth of FIFO register. Here, the depth N of FIFO register has $2^n$ format so that the modulo-operation can be implemented by simply selecting (3) a low order n-bit.

At this time, in order to make a combiner read a combined signal, the control logic part (3) generates a signal 'rd_point'. To prevent the loss of a symbol demodulated in each finger, the signal 'rd_point' starts behind by 'k' symbol with respect to a signal 'wr_point' of the fastest finger. Here, the value of the 'k' symbol may be set to a proper value according to a system, and is changed with the lapse of time because of PN code tracking and a slewing of each finger.

Figure 5:
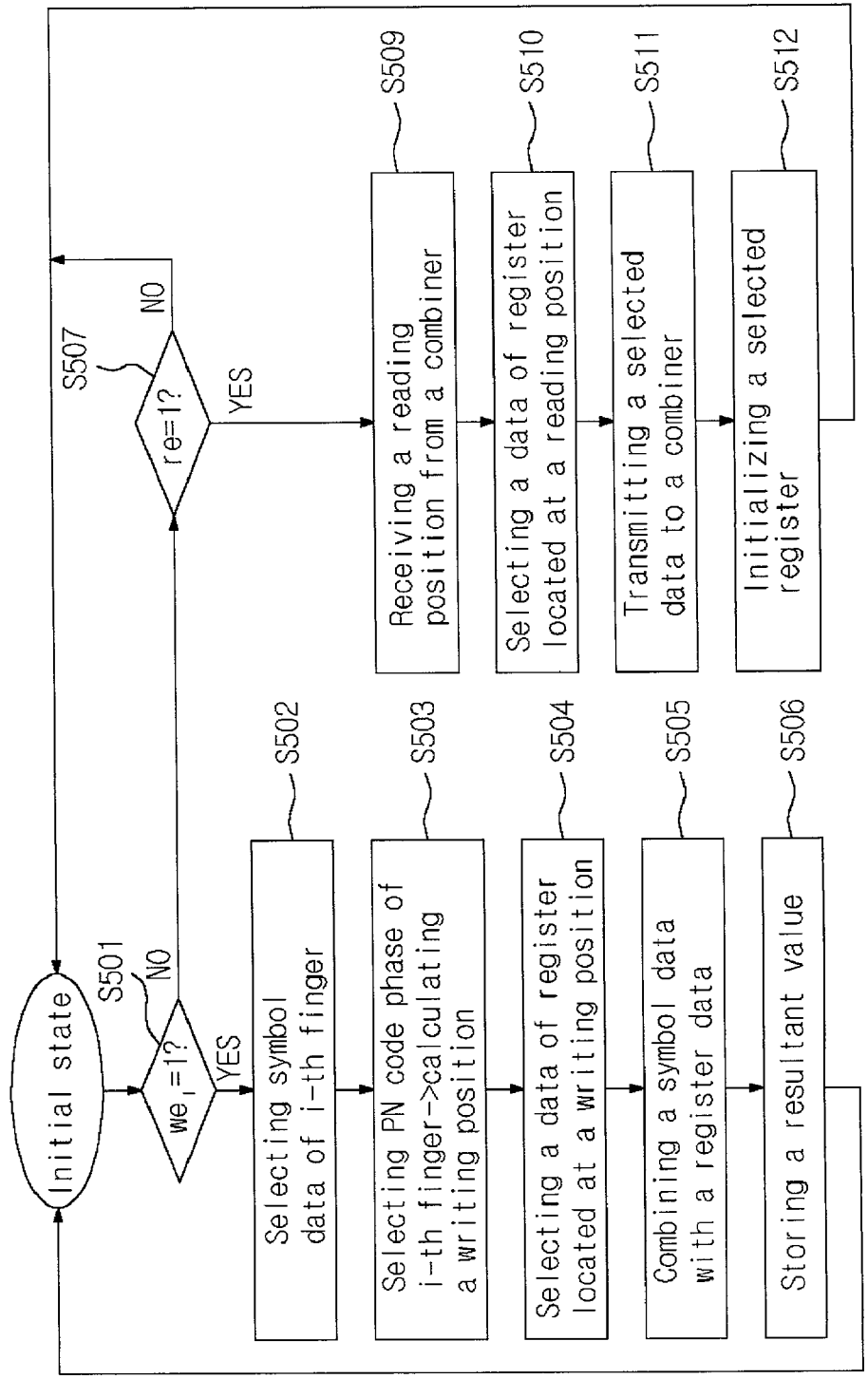
FIG. 5 is a flowchart illustrating a symbol combining algorithm according to a preferred embodiment of the present invention.

FIG. 5 is a flowchart illustrating a symbol combining algorithm according to a preferred embodiment of the present invention, and will be described in the following.

As to a writing operation, in a step S501, when a data is to be stored in a FIFO register (that is, if a signal 'we$_i$' is generated) after finishing a processing of a symbol data in an i-th finger, a control logic part selects a symbol data of i-th finger in a step S502 and selects PN code phase of i-th finger in a step S503. That is, by using the selected PN code phase, the control logic part calculates a writing position of indicating a block of the register where a symbol data is stored.

After that, if the writing position is calculated, a step S504 reads a data of the block located at the calculated writing position, among a plurality of register blocks. The read block data is combined with a symbol data to be stored in a step S505, and the combined resultant value of the read block data and the symbol data is stored into the block located at the calculated writing position. After completing all writing operations, the control logic part returns to the initial state, and waits for the next 'we' signal. If at least two fingers ask a storage action at the same time (namely, if at least two fingers generate the signal 'we' at the same time), a finger of a low number has priority to a finger of a high number in performing the aforementioned step S501.

As to a reading operation, if a writing operation is performed during a predetermined symbol (i.e., about 'k' symbol) in steps S507–S509, a combiner starts to read a data stored in a FIFO register. In this case, a combiner generates a reading signal 're' in the control logic part, and informs the control logic part of a block position of a FIFO register to be read.

Then, the control logic part selects a data of a block located at a reading position, among a plurality of register blocks in a step S510, transmits the selected block data to a combiner in a step S511, and then initializes the selected block in the step S512. After finishing all reading operations, the control logic part returns to the initial state, and waits for the next 're' signal.

Figure 6:
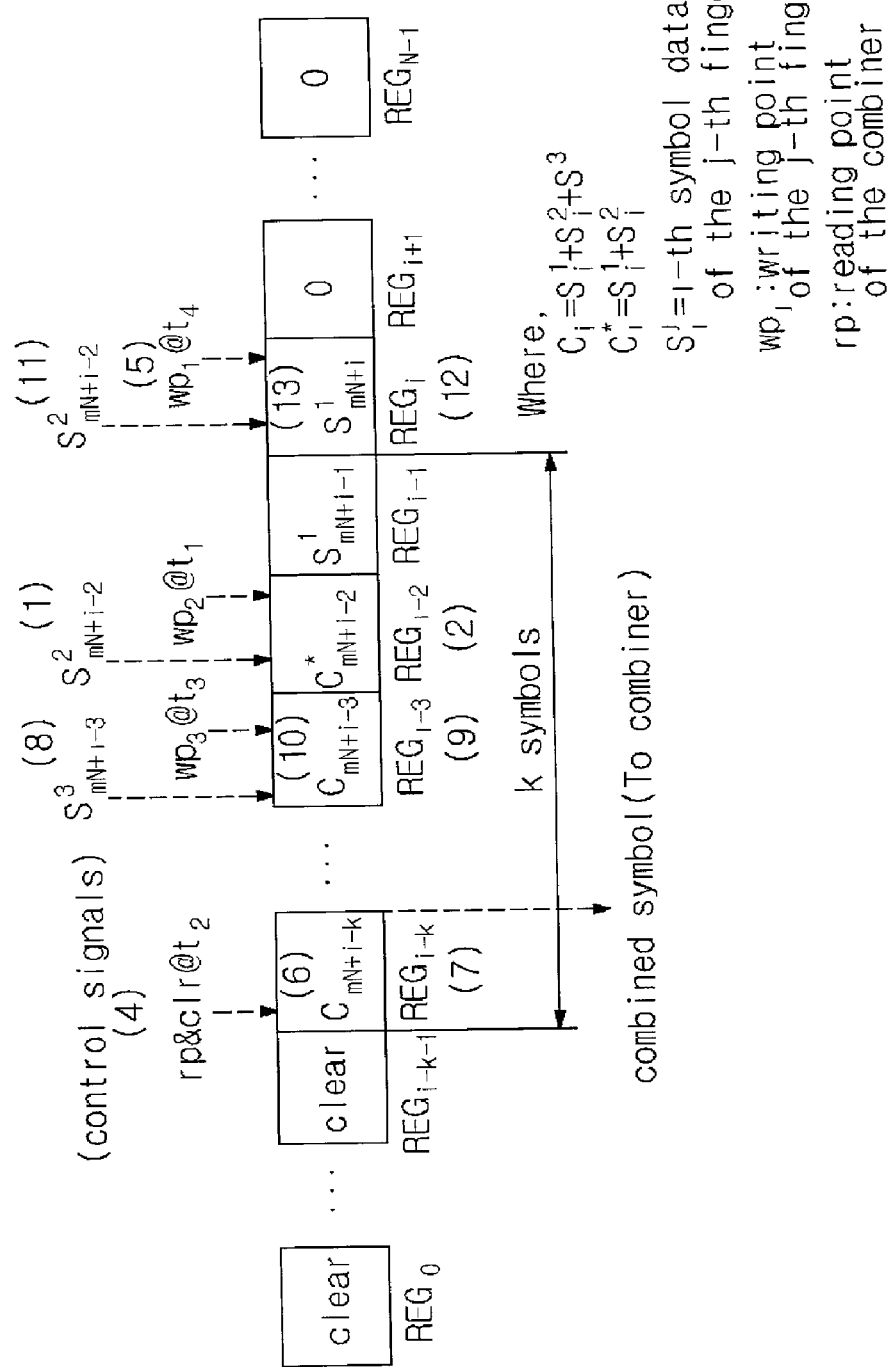
FIG. 6 is a conceptual diagram illustrating operations of a symbol combining algorithm, in case that a timing reference of a symbol demodulated by each finger differs due to a multi-path time delay under the condition that a hand-off does not occur.

FIG. 6 is a conceptual diagram illustrating operations of a symbol combining algorithm, in case that a timing reference of a symbol demodulated by each finger differs due to a multi-path time delay under the condition that a hand-off does not occur.

For the convenience of an operation description, let us suppose that a first finger demodulates a multi-path signal having the shortest time delay and a third finger demodulates a multi-path signal having the longest time delay. Also, let us suppose that an operation of the symbol combining algorithm of FIG. 6 follows the order of t1→t2→t3→t4.

In case of t1, if a second finger demodulates (mN+i−2)-th symbol data $(1, S^2_{mN+i-2})$, the control logic part outputs a symbol data $(S^1_{mN+i-2})$ that is demodulated by the first finger and is previously stored in (i−2)-th block (2) of FIFO register, then adds the symbol data $(S^1_{mN+i-2})$ to a symbol data demodulated by the second finger, and stores a resultant value $C^*_{mN+i-2}(3)(=S^1_{mN+i-2}+S^2_{mN+i-2})$ into (i−2)-th block of the FIFO register.

Next, in case of t2, if a combiner generates a reading signal(4) to read a combined symbol, the control logic part selects a symbol data $(6, C_{mN+i-k}=S^1_{mN+i-k}+S^2_{mN+i-k}+S^3_{mN+i-k})$ separated from a writing position (5) of a first finger by 'k' symbol, and transmits the selected symbol data to the combiner. If the symbol data is output to the combiner, the control logic part initializes a register (7) for the next symbol data.

In case of t3, if a third finger demodulates (mN+i−3)-th symbol data $(8, S^3_{mN+i-3})$, the control logic part outputs a data $(C^*_{mN+i-3}=S^1_{mN+i-3}+S^2_{mN+i-3})$ that is demodulated/accumulated by the first and second fingers and is previously stored in (i−3)-ith block (9) of FIFO register, then adds the data $(C^*_{mN+i-3}=S^1_{mN+i-3}+S^2_{mN+i-3})$ to a symbol data demodulated by the third finger, and stores a resultant value $(10, C_{mN+i-3}=S^1_{mN+i-3}+S^2_{mN+i-3}+S^3_{mN+i-3})$ into (i−3)-th block of FIFO register.

In case of t4, if a first finger demodulates (mN+i)-th symbol data $(11, S^1_{mN+1})$, the control logic part selects i-th block (12), adds a previous data and a symbol data of the first finger, and stores a resultant value (13) into the i-th block (12). In this case, the demodulated data is not present prior to the first finger so that a symbol data of the first finger is only stored in the i-th block (12).

By repeating the above steps, three fingers combine a symbol by using one FIFO register, and perform a timing synchronization of a symbol.

Figure 7:
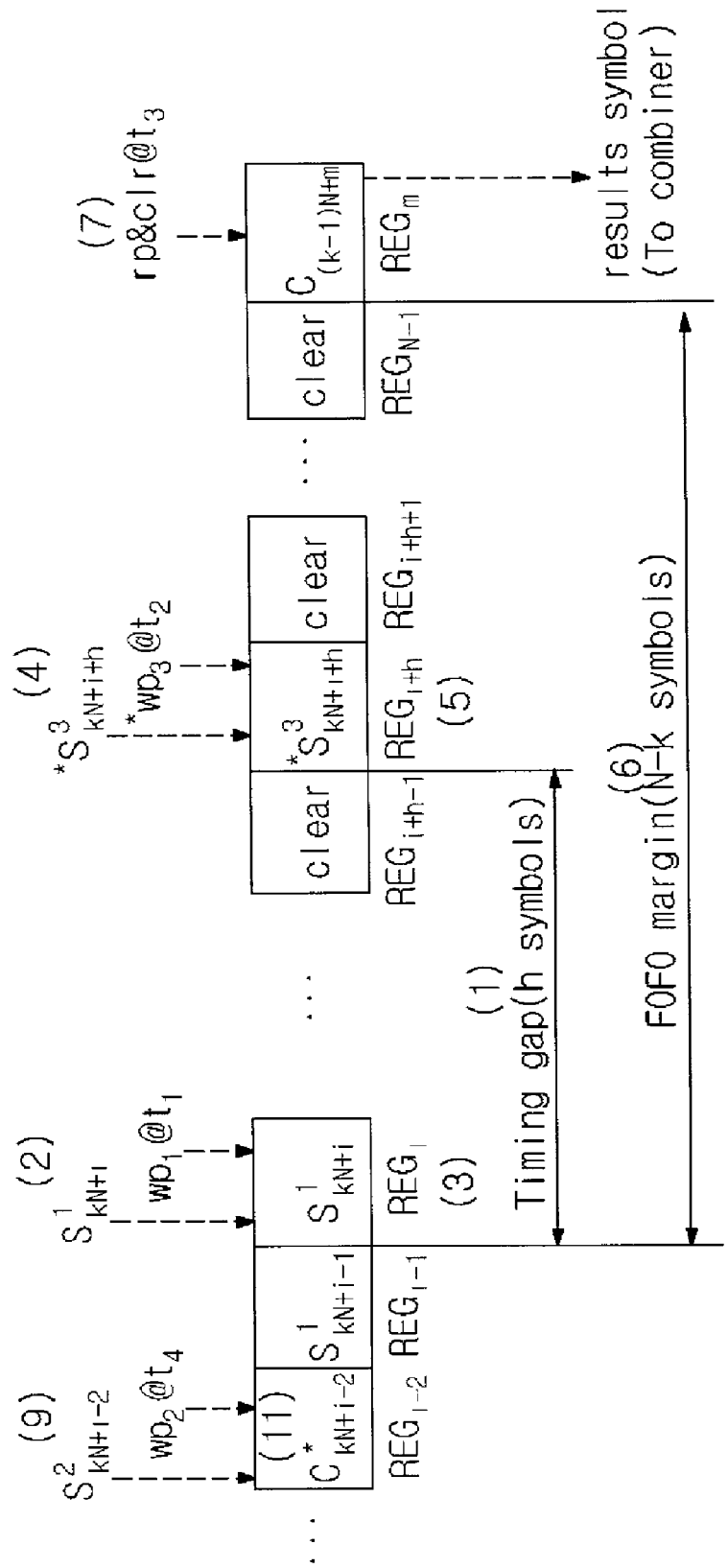
FIG. 7 is a conceptual diagram illustrating operations of a symbol combining algorithm, in case that a timing reference of a symbol demodulated by each finger differs due to a multi-path time delay under the condition that a hand-off occurs.

FIG. 7 is a conceptual diagram illustrating operations of a symbol combining algorithm, in case that a timing reference of a symbol demodulated by each finger differs due to a multi-path time delay under the condition that a hand-off occurs.

For the convenience of an operation description, let us suppose that a third finger demodulates the signal of the base station to be handed off, and first and second fingers demodulate the signal of the previous base station. Also, assuming that a mobile station is moving to the base station to be handed off, let us suppose that the signal of the base station to be handed off is leading (1) by 'h' symbol with respect to the signal of the previous base station. Further, let us suppose that a writing operation of each finger passes through the last position of FIFO register and returns to the initial position, and the reading operation of a combiner has not passed through the last position of the FIFO register yet.

In case of t1, if a first finger receives a base station signal prior to a hand-off and demodulates (kN+i)-th symbol data $(2, S^1_{kN+1})$, the control logic part accumulates the symbol data demodulated by the first finger in i-th block (3) of FIFO register. Since the i-th block (3)'s operation starts after a combiner reads a combined data, the i-th block (3) is previously initialized before the first finger demodulates a symbol data.

In case of t2, if a first finger receives a signal of a base station to be handed off and demodulates (kN+i+h)-th symbol data $(4, *S^3_{kN+i+h})$, the third finger demodulates a signal ahead by 'h' symbol with respect to the first finger, so that the control logic part accumulates a symbol data demodulated by the third finger in (i+h)-th block (5) of the FIFO register. In this case, a time interval (6, N−k symbol) between a writing position of the first finger and a reading position of a combiner is determined to compensate a time delay between the base stations caused by a hand-off action, therefore, it is desirable that a data of the third finger is determined not to exceed a reading position of a combiner. When the data of the third finger exceeds the reading position of the combiner, the control logic part generates a FIFO error signal so as to inform an error of the FIFO register.

In case of t3, if the combiner generates a reading signal, the control logic part selects a storage data value $(7, C_{(k-1)N+m})$ indicated at a reading position, and transmits the storage data value $(7, C_{(k-1)N+m})$ to the combiner. If the reading operation of the combiner is completed, the control logic part initializes the m-th register (8).

In case of t4, if a second finger receives a base station signal prior to a hand-off and demodulates (kN+i−2)-th symbol data $(9, S^2_{kN+i-2})$, the control logic part accumulates a symbol data demodulated by the second finger in the (i−2)-th block (10), and stores a resultant value $(11, C^*_{kN+1-2})$ in the (i−2)-th block (10).

As described above, a combining algorithm according to the present invention can simultaneously perform a timing synchronization of the symbol data of each finger while performing a combining operation. Thus, only one FIFO register is required to perform the operation.

In other words, the combining algorithm according to a preferred embodiment of the present invention does not use a separate FIFO register for each finger, and uses only one FIFO register irrespective of the number of fingers. Therefore, one FIFO register per one channel to be demodulated can be used. As a result, in case of Rake receiver using three fingers, the number of hardwares used for a conventional algorithm can be reduced by over 65%. In case of another Rake receiver using more than three fingers, more portions of the hardware of Rake receiver can be reduced. In addition, the inventive combining algorithm can be applicable to all mobile communication systems using FIFO register for symbol combination, so that the inventive combining algorithm can be very effectively employed to a complicated system such as MC-CDMA system for reducing the number of hardwares.

As stated above, the symbol combining algorithm for reducing the number of FIFO registers can be designed by using a plurality of signals used in a conventional algorithm, and can simply embody a control logic for controlling a changed algorithm. Besides, the inventive symbol combining algorithm uses only one FIFO register per one demodulation channel irrespective of a conventional algorithm, thereby reducing the number of hardwares of FIFO register. As a result, in case of a complicated system having a difficulty in designing, among many systems such as IMT-2000 system using CDMA method, the inventive symbol combining algorithm can provide a very effective solution for reducing the number of the complicated hardwares.

Although representative embodiments of the present invention have been disclosed for illustrative purposes, those who are skilled in the art will appreciate that various modifications, additions and substitutions are possible without departing from the scope and spirit of the present invention as defined in the accompanying claims and the equivalents thereof.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A Rake receiver for performing a symbol combining function with respect to demodulated multi-path signals in a demodulation step of a code division multiple access (CDMA) communication system, comprising only one FIFO (First-In First Out) register that accumulates a plurality of previously-stored FIFO register values by using an adding part and then stores the accumulated value in the FIFO register when storing a finger-demodulated symbol in the FIFO register, and further including a control logic part that determines a block position of the FIFO register where a transmitted symbol demodulated in each finger is to be stored and outputs a combined symbol data after receiving an output signal, and wherein the control logic part includes a circuit for calculating a writing position of the FIFO register by using a phase of a PN code, a symbol duration, and a depth of the FIFO register.

2. The Rake receiver according to claim 1, wherein the control logic part includes a part that sequentially selects a symbol data of each finger to be combined by using a writing signal and a symbol duration that are received from each finger.

3. The Rake receiver according to claim 1, wherein the circuit determines a writing position of the FIFO register by using the following equation:

$$W = \left(\left\lfloor \frac{P}{S} \right\rfloor - 1\right) \bmod N$$

where, $[x]$ is a maximum integer below 'x', x mod y(modulo-operation) is a remainder when 'x' is divided by 'y', W is a variable indicating a storage position of a selected symbol data, P is a variable indicating a timing reference of each symbol by using a phase of PN code, S is a variable indicating a symbol duration, and N is a depth of the FIFO register.

4. The Rake receiver according to claim 1, further comprising:
a combiner for combining a symbol data demodulated in each finger with an output value of the FIFO register.

5. A method of combining a symbol of demodulated multi-path signals in a demodulation step of a CDMA communication system, comprising the steps of:
accumulating a plurality of previously-stored FIFO register values by using an adding part and then storing the accumulated values in the FIFO register when storing a finger-demodulated symbol in the FIFO register; and
calculating a writing position of the FIFO register by using a phase of a PN code, a symbol duration, and a depth of the FIFO register.

6. The symbol combining method according to claim 5, further comprising the step of:
sequentially selecting a symbol data of each finger to be combined by using a writing signal and the symbol duration that are received from each finger.

7. The symbol combining method according to claim 5, further comprising the step of:
determining a writing position of the FIFO register by using following equation:

$$W = \left(\left\lfloor \frac{P}{S} \right\rfloor - 1\right) \bmod N$$

where, $[x]$ is a maximum integer below 'x', x mod y(modulo-operation) is a remainder when 'x' is divided by 'y', W is a variable indicating a storage position of a selected symbol data, P is a variable indicating a timing reference of each symbol by using a phase of PN code, S is a variable indicating the symbol duration, and N is a depth of the FIFO register.

8. The symbol combining method according to claim 5, further comprising the step of:
combining a symbol data demodulated in each finger with an output value of the FIFO register.

9. A symbol combining method for driving a Rake receiver that includes only one FIFO register, comprising:
accumulating a plurality of previously-stored FIFO register values by using an adding part and then storing the accumulated value in the FIFO register when storing a finger-demodulated symbol in the FIFO register;
when storing data in the FIFO register after finishing a processing of the symbol data in an i-th finger, selecting a symbol data and a pseudo noise(PN) phase of the i-th finger;
calculating a writing position of indicating a block of the register where the symbol data is stored by using a selected PN code phase; and
reading the data of the block located at the calculated writing position, combining the read block data with the symbol data to be stored, and storing a resultant value into the block located at the calculated writing position, wherein the step of calculating a writing position by using a selected PN code phase comprises determining the writing position of the FIFO register by using the following equation:

$$W = \left(\left\lfloor \frac{P}{S} \right\rfloor - 1\right) \bmod N$$

where, [x] is a maximum integer below 'x', x mod y (modulo-operation) is a remainder when 'x' is divided by 'y', W is a variable indicating a storage position of a selected symbol data, P is a variable indicating a timing reference of each symbol by using a phase of the PN code, S is a variable indicating the symbol duration, and N is a depth of the FIFO register.

10. The symbol combining method for driving Rake receiver according to claim 9, further comprising the step of:

if at least two fingers ask a storage action at the same time, firstly processing a finger of a low number prior to a finger of a high number, and then processing the finger of a high number.

11. A symbol combining method for driving a Rake receiver having only one FIFO register, comprising:

accumulating a plurality of previously-stored FIFO register values by using an adding part and then storing the accumulated value in the FIFO register when storing a finger-demodulated symbol in the FIFO register;

a) when storing data in the FIFO register after finishing a processing of the symbol data in an i-th finger, selecting a symbol data and a pseudo noise(PN) phase of the i-th finger;

b) calculating a writing position indicating a block of the register where the symbol data is stored by using the selected PN code phase;

c) reading the data of the block located at the calculated writing position, combining the read block data with the symbol data to be stored, and storing a resultant value into the block positioned at the calculated writing position;

d) repeating steps (a), (b) and (c);

e) upon generation of a reading signal, calculating a block position of the FIFO register to be read; and f) selecting data located at the calculated block position of the FIFO register in step(e), transmitting the selected data to a combiner, and then initializing the register.

12. The symbol combining method for driving Rake receiver according to claim 11, further comprising the step of:

if at least two fingers ask a storage action at the same time, firstly processing a finger of a low number prior to a finger of a high number, and then processing the finger of a high number.

13. The symbol combining method for a driving Rake receiver according to claim 11, wherein the step for calculating a writing position by using a selected PN code phase determines a writing position of the FIFO register by using the following equation:

$$W = \left(\left\lfloor \frac{P}{S} \right\rfloor - 1\right) \bmod N$$

where, [x] is a maximum integer below 'x', x mod y (modulo-operation) is a remainder when 'x' is divided by 'y', W is a variable indicating a storage position of a selected symbol data, P is a variable indicating a timing reference of each symbol by using a phase of the PN code, S is a variable indicating a symbol duration, and N is a depth of the FIFO register.

14. A computer-readable storage medium, comprising the storage of a program for executing a symbol combining demodulated multi-path signals in a demodulation step of a CDMA communication system, wherein the program executes the steps of:

accumulating a plurality of previously-stored FIFO register values by using an adding part;

storing the accumulated value in the FIFO register; when storing a finger-demodulated symbol in the FIFO register; and determining a block position of the FIFO register where the transmitted symbol demodulated in each finger is to be stored, and outputs a combined symbol data after receiving an output signal;

wherein the determining step includes a sub-step for calculating a writing position of the FIFO register by using a phase of a PN code, a symbol duration, and a depth of FIFO register.

15. A computer-readable storage medium recording a program for executing a symbol combining method for driving a Rake receiver that includes only one FIFO register, and accumulates a plurality of previously-stored FIFO register values by using an adding part, and then stores the accumulated value in the FIFO register when storing a finger-demodulated symbol in the FIFO register, comprising the steps of:

when storing data in the FIFO register after finishing a processing of the symbol data in an i-th finger, selecting a symbol data and a pseudo noise(PN) phase of the i-th finger;

calculating a writing position indicating a block of the register where the symbol data is stored, by using the selected PN code phase; and reading the data of the block located at the calculated writing position, combining the read block data with the symbol data to be stored, and storing a resultant value into the block located at the calculated writing position, wherein the step for calculating a writing position by using a selected PN code phase determines a writing position of the FIFO register by using the following equation:

$$W = \left(\left\lfloor \frac{P}{S} \right\rfloor - 1\right) \bmod N$$

where, [x] is a maximum integer below 'x', x mod y (modulo-operation) is a remainder when 'x' is divided by 'y', W is a variable indicating a storage position of a selected symbol data, P is a variable indicating a timing reference of each symbol by using a phase of the PN code, S is a variable indicating a symbol duration, and N is a depth of the FIFO register.

16. A computer-readable storage medium, comprising:

a program stored in the medium for executing a symbol combining method for driving a Rake receiver that includes only one FIFO register, accumulates a plurality of previously-stored FIFO register values by using an adding part, and then stores the accumulated value in the FIFO register when storing a finger-demodulated symbol in the FIFO register, the program executing the steps of: a1) when storing data in the FIFO register after finishing a processing of the symbol data in an i-th finger, selecting a symbol data and a pseudo noise(PN) phase of the i-th finger;

b1) calculating a writing position indicating a block of the register where the symbol data is stored by using the selected PN code phase;

c1) reading the data of the block located at the calculated writing position, combining the read block data with the symbol data to be stored, and storing a resultant value into the block located at the calculated writing position.

d1) repeating steps (a1), (b1) and (c1);

e1) upon generation of a reading signal, calculating a block position of the FIFO register to be read; and f1) selecting data located at the calculated block position of the FIFO register in step(e1), transmitting the selected data to a combiner, and then initializing the block.

* * * * *